(12) United States Patent
Bryant et al.

(10) Patent No.: US 12,649,357 B2
(45) Date of Patent: Jun. 9, 2026

(54) PANEL ASSEMBLY FOR A VEHICLE

(71) Applicant: GM Global Technology Operations LLC, Detroit, MI (US)

(72) Inventors: Wade W. Bryant, Grosse Point Farms, MI (US); Thiago Canola Afonso, Sterling Heights, MI (US); Junglim Huh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 18/355,612

(22) Filed: Jul. 20, 2023

(65) Prior Publication Data

US 2025/0026187 A1     Jan. 23, 2025

(51) Int. Cl.
B60J 5/04 (2006.01)
B60R 13/02 (2006.01)
B60R 13/04 (2006.01)

(52) U.S. Cl.
CPC ........... B60J 5/0463 (2013.01); B60J 5/0401 (2013.01); B60J 5/0413 (2013.01); B60J 5/0415 (2013.01); B60J 5/0493 (2013.01); B60R 13/0243 (2013.01); B60R 13/043 (2013.01)

(58) Field of Classification Search
CPC ...... B60J 5/0463; B60J 5/0401; B60J 5/0413; B60J 5/0415; B60J 5/0493; B60R 13/0243; B60R 13/043
See application file for complete search history.

(56) References Cited

U.S. PATENT DOCUMENTS

| | | | | |
|---|---|---|---|---|
| 7,517,002 B2 * | 4/2009 | Reed | ........................ | B60N 3/12 296/146.7 |
| 2017/0080784 A1 | 3/2017 | Kobayashi et al. | | |
| 2018/0186295 A1 * | 7/2018 | Akdag Cakir | .......... | B60R 7/005 |
| 2024/0217319 A1 * | 7/2024 | Maldonado | ............ | B60J 5/0416 |

FOREIGN PATENT DOCUMENTS

| | | | | | |
|---|---|---|---|---|---|
| CN | 116619997 A | * | 8/2023 | ............ | B60J 5/0493 |
| CN | 118722168 A | * | 10/2024 | .............. | B60R 3/02 |
| DE | 19747710 A1 | | 5/1999 | | |
| DE | 102015107136 A1 | | 11/2015 | | |
| DE | 102023208191 A1 | | 3/2025 | | |
| KR | 20150054478 A | * | 5/2015 | ............ | B60R 7/046 |
| KR | 101535082 B1 | * | 7/2015 | .............. | B60J 5/04 |

* cited by examiner

*Primary Examiner* — Faye M Fleming
(74) *Attorney, Agent, or Firm* — Honigman LLP; Matthew H. Szalach; Jonathan P. O'Brien

(57) ABSTRACT

A panel assembly for a vehicle door includes an interior panel that has an inner surface and an outer surface. The inner surface and the outer surface collectively define a body and a trim element that is integrally formed with the body with a living hinge disposed therebetween. The panel assembly also includes an exterior panel that has an inner surface that is coupled to the body at the inner surface of the interior panel and has an opposing outer surface that is coupled to the trim element in a folded position of the trim element.

18 Claims, 5 Drawing Sheets

PANEL ASSEMBLY FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a panel assembly for a vehicle.

As vehicles travel along the road, dust, dirt, and various debris may contact a lower region of the vehicle. The repeated contact with these materials may eventually wear down or otherwise affect the paint of the vehicle. Conventional vehicles include a piece of plastic material along the bottom edge of the panels to buffer contact with materials from the road. The plastic material is typically a separately formed piece that is attached to the outside panel using various clips and fasteners.

The separate manufacture and attachment of the plastic material may add to overall production costs and manufacture time. The outside panel is typically formed with holes to receive the fasteners that secure the plastic material over the outside panel for support during use. Conventional assembly of the panels first assembles the panels for the vehicle and subsequently adds the plastic material along the bottom edge of the outer panels via upper and lower fasteners. Thus, the conventional solution to guard the outer panels from damage using the plastic material may add to the overall cost and manufacture of the vehicle panels.

SUMMARY

In some configurations, a panel assembly for a vehicle includes an interior panel including an upper portion having an outer surface and an inner surface and a lower portion that is integrally formed with the upper portion. The lower portion has a first surface and a second surface. The interior panel also includes a living hinge that is defined between the upper portion and the lower portion where the lower portion is operable between an extended position and a folded position about the living hinge. The panel assembly also includes an exterior panel that is coupled to the interior panel to define a cavity and includes a first end an opposing end that is coupled to the lower portion of the interior panel in the folded position with the lower portion at least partially disposed over the second end of the exterior panel.

In some aspects, the living hinge may be integrally formed with the upper portion and the lower portion. The lower portion may be coupled to the exterior panel via an attachment flange disposed between the exterior panel and the interior panel. The exterior panel may include a flange that may be coupled to the attachment flange of the lower portion in the folded position of the lower portion. In some examples, a central frame may be disposed within the cavity defined between the interior panel and the exterior panel. Optionally, the lower portion may be coupled to an inner surface of the exterior panel. A door of the vehicle may include the panel assembly.

In another configuration, a vehicle panel assembly may include a first panel that has an outer surface and an inner surface. The first panel includes an upper portion and a lower portion that is hingedly coupled to the upper portion via a living hinge. The lower portion is operable about the living hinge between a first position and a second position. The vehicle panel assembly also includes a second panel having an outer surface and an opposing inner surface that is coupled to the inner surface of the first panel and defines a cavity with the first panel. The lower portion of the first panel is coupled to the outer surface of the second panel in the second position of the lower portion.

In some examples, the living hinge may define at least a portion of a bottom edge of the vehicle panel assembly when the lower portion is in the second position. Optionally, the living hinge may have a thickness that is less than a thickness of at least one of the upper portion and the lower portion. The inner surface defined along the lower portion may be diametrically opposed to the inner surface defined along the upper portion when the lower portion is in the second position. In some aspects, the first panel may have a length that is greater than a length of the second panel. In other examples, the second panel may define a plurality of apertures along a flange of the second panel. The lower portion may include an attachment flange that may include a plurality of fasteners that may be selectively disposed within the plurality of apertures that may be defined along the flange when the lower portion is in the second position.

In yet another configuration, a panel assembly for a vehicle door includes an interior panel that has an inner surface and an outer surface. The inner surface and the outer surface collectively define a body and a trim element that is integrally formed with the body with a living hinge disposed therebetween. The panel assembly also includes an exterior panel that has an inner surface that is coupled to the body at the inner surface of the interior panel and has an opposing outer surface that is coupled to the trim element in a folded position of the trim element.

In some aspects, the trim element may be operable about the living hinge between an extended position and the folded position. The living hinge and the trim element may define an extension of the interior panel and may define a bottom edge of the panel assembly in the folded position of the trim element. The trim element may have a stepped configuration that includes a ledge that defines a lip. In some examples, the body may define a recessed portion and the trim element may be aligned relative to the recessed portion in the folded position.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
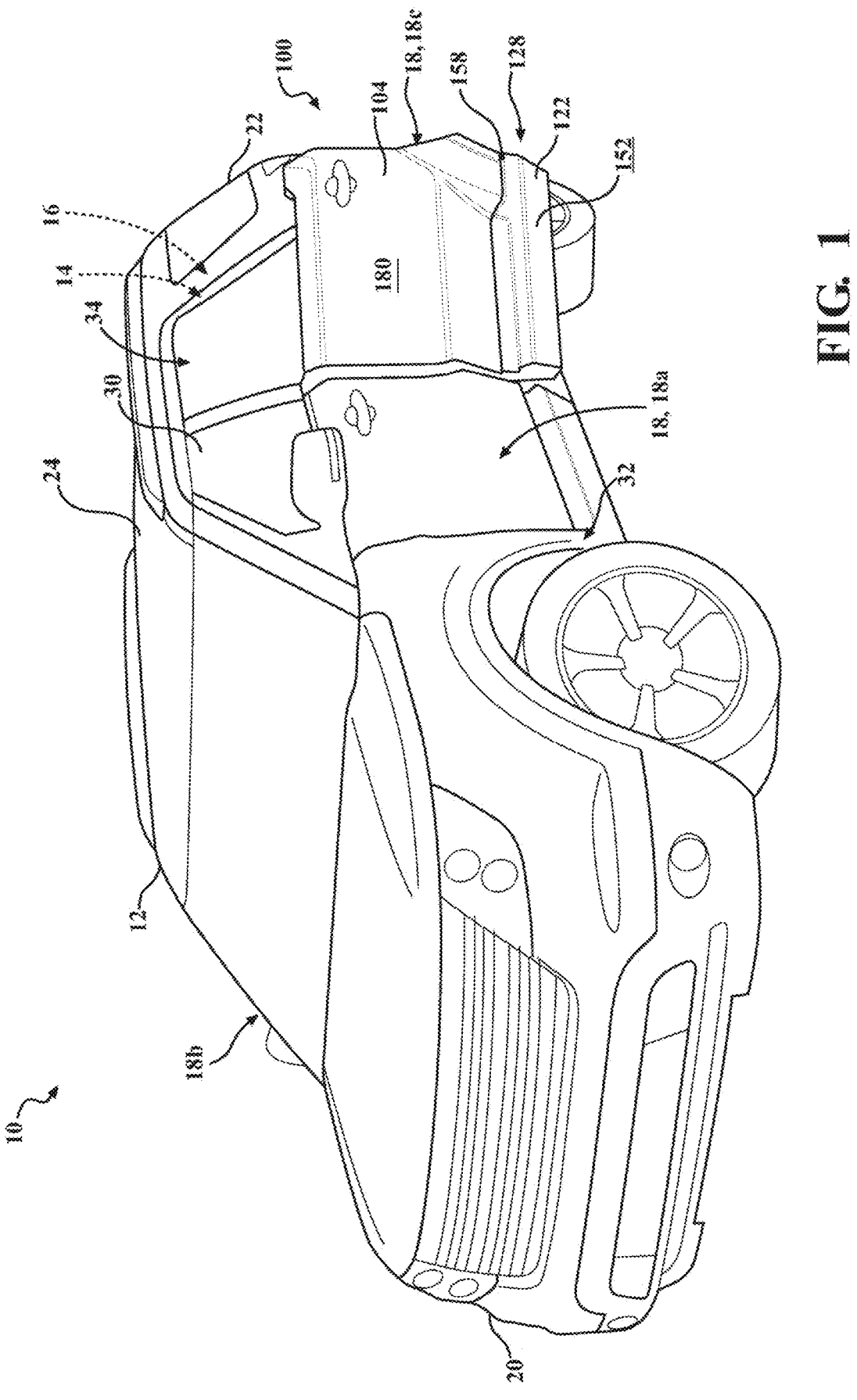
FIG. 1 is a top perspective view of a vehicle with a panel assembly according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

Figures 2, 3:
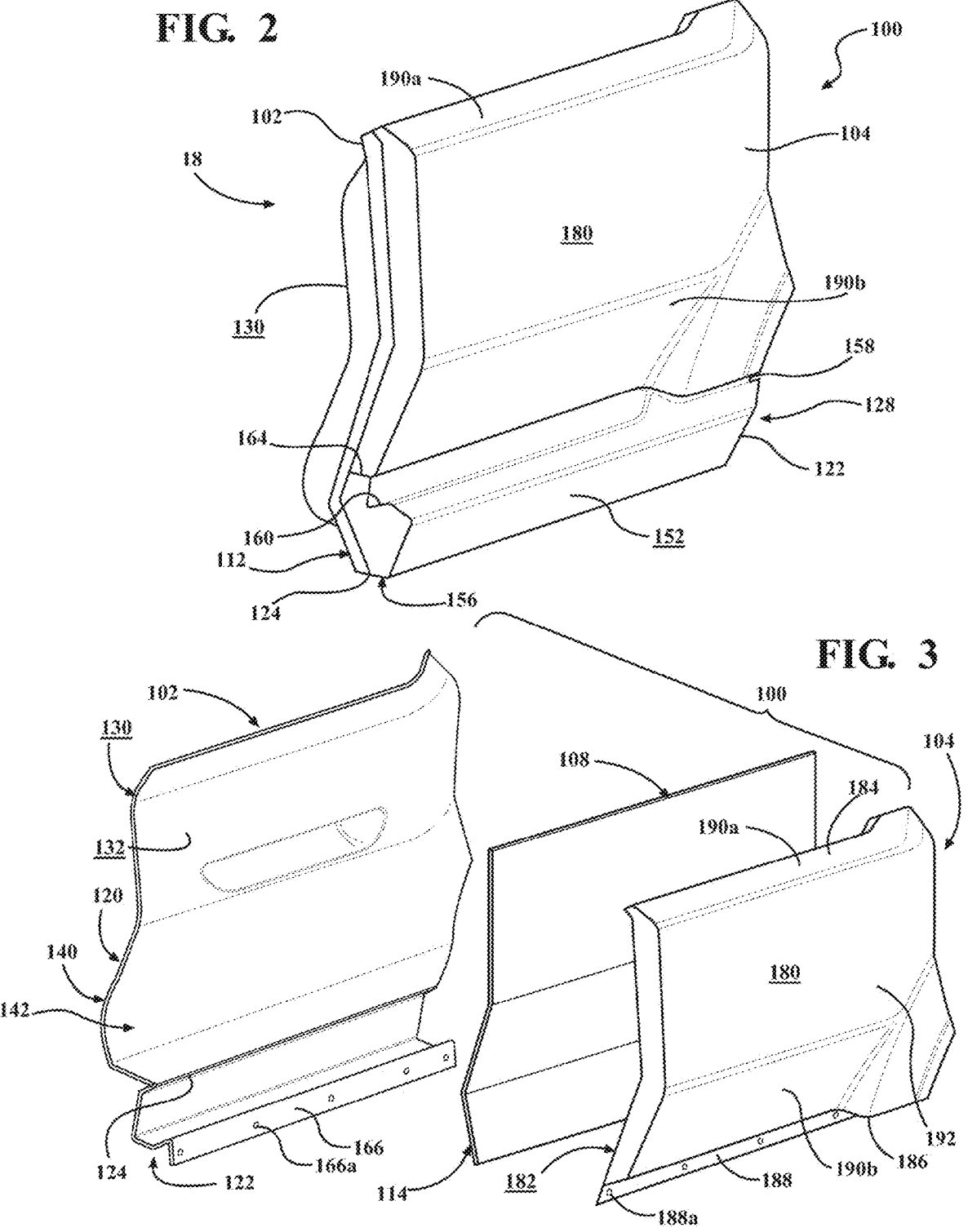
FIG. 2 is a perspective view of a panel assembly according to the present disclosure.
FIG. 3 is an exploded perspective view of the panel assembly of FIG. 2.

Referring to FIGS. 1-3, a vehicle 10 includes a vehicle body 12, defining an interior 14 of the vehicle 10 including a passenger compartment 16 therein. A plurality of doors 18 are coupled to the vehicle body 12 to provide selective access to the passenger compartment 16. For example, the plurality of doors 18 may include a driver side door 18a, a passenger side door 18b, and rear passenger doors 18c. The vehicle 10 may be driver-based, semi-autonomous, or fully autonomous and may include a variety of vehicle styles including, but not limited to, a sedan, a sport utility vehicle, a truck, a van, a crossover, a utility vehicle, a service vehicle, and/or any other vehicle configuration. In some configurations, the plurality of doors 18 may include a rear door to provide access to the interior 14. In other aspects, the plurality of doors 18 may slide along the vehicle body 12, such that the plurality of doors 18 may be coupled to the vehicle body 12 via track elements.

The plurality of doors 18 may be operable along a horizontal plane, such that the plurality of doors 18 may provide access to the passenger compartment 16 by an occupant articulating the respective door 18 toward a vehicle forward portion 20 or a vehicle rearward portion 22. Additionally or alternatively, one or more of the doors 18 may be operable along a vertical plane, such that the respective door 18 may be articulated toward and away from a roof 24 of the vehicle body 12. Each door 18 of the plurality of doors 18 includes a panel assembly 100 of the vehicle 10. The panel assembly 100 is described herein with respect to a single door 18 of the vehicle 10. However, it is contemplated that the panel assembly 100 may be utilized for any one of the plurality of doors 18 mentioned above.

With reference to FIGS. 1-4A, the door 18 is formed from the panel assembly 100 and may include a window panel 30 coupled to the panel assembly 100 and selectively received within the panel assembly 100. The panel assembly 100 includes a first panel 102 and a second panel 104 defining a cavity 106 in which a central frame 108 may be disposed. The central frame 108 is positioned against the first panel 102 to define contact between the first panel 102 and the central frame 108. Thus, when the door 18 is closed relative to the vehicle body 12, the central frame 108 and the first panel 102 may be engaged with the vehicle body 12. For purposes of illustration, the cross-sections depicted may illustrate the central frame 108 being at least partially spaced apart from the first panel 102. However, the space defined between the central frame 108 and the first panel 102 is for illustrative purposes, and the central frame 108 is contemplated as being in direct contact with the first panel 102.

Further, the central frame 108 may extend from a leading edge and a trailing edge of each of the first panel 102 and the second panel 104. For example, the central frame 108 may be at least partially exposed along the side portions of the first panel 102 and the second panel 104 to assist in attaching the panel assembly 100, and thus the door 18, to the vehicle body 12. The window panel 30 may be received within the cavity 106 and be disposed within a pocket 110 defined by central frame 108. Although the panel assembly 100 is described herein with respect to the door 18, it is contemplated that the panel assembly 100 may be utilized in various locations of the vehicle 10 including, but not limited to, side panels along the vehicle body 12.

The first panel 102 may be configured as an interior panel 102 of the panel assembly 100. The interior panel 102 includes an upper portion 120 and a lower portion 122 that are integrally formed with one another and separated by a living hinge 124 defined therebetween. For example, the living hinge 124 and the lower portion 122 may define an extension of the interior panel 102. The living hinge 124 is integrally formed with each of the upper portion 120 and the lower portion 122 and is configured to translate the lower portion 122 between a first position 126 and a second position 128, described in more detail below. The upper portion 120 of the interior panel 102 may be referred to as a body 120 of the interior panel 102, such that the body 120 defines a majority portion of the interior panel 102. The body 120 has a first, outer surface 130 and an opposing second, inner surface 132 defined relative to the second panel 104 and the cavity 106 defined therebetween.

For example, the inner surface 132 of the body 120 is proximate to the central frame 108 in an assembled configuration of the panel assembly 100, and the outer surface 130 opposes the inner surface 132. In some aspects, the outer surface 130) is positioned within the interior 14 of the vehicle 10, such that the outer surface 130 of the body 120 may be exposed within the passenger compartment 16. For example, the outer surface 130 is defined as opposing the cavity 106 defined between the first panel 102 and the second panel 104. The outer surface 130 of the body 120 may include a support 134 extending from the outer surface 130 proximate a first end 136 of the body 120. The support 134 may be positioned proximate to the window panel 30 and may provide support for an occupant. In some aspects, the support 134 may house controls for the window panel 30 and/or may include components for securing the door 18 in a locked position relative to the vehicle body 12.

A second end 138 of the body 120 may angle toward the interior 14 of the vehicle 10. For example, the second end 138 may include an angular portion 140. The angular portion 140 may assist in maximizing space within the passenger compartment 16 near a footwell of the vehicle 10. While the angular portion 140 is generally defined along the outer surface 130, the angular portion 140 may also define a recessed portion 142 along the inner surface 132 of the body 120. As described below, the recessed portion 142 is generally configured to accommodate the lower portion 122 of the interior panel 102 in the second position 128 of the lower portion 122.

With further reference to FIGS. 1-4A, the lower portion 122 of the interior panel 102 may be referred to throughout as a trim element 122. For example, the lower portion 122 of the first panel 102 is selectively disposed on the second panel 104, as described in more detail below; to define the trim element 122 of the vehicle 10. The lower portion 122 is operable between the first position 126 and the second position 128 to define the lower portion 122 as the trim element 122 along the second panel 104. As described herein, the terms lower portion 122 and trim element 122 may be used interchangeably.

The upper portion 120, the lower portion 122, and the living hinge 124 are all integrally formed from a single polymeric material to define the first panel 102. For example, the first panel 102 may be formed via injection molding. It is also contemplated that in some aspects, the upper portion 120 may be formed from a stamped metal material. A thickness of the living hinge 124 is less than the thickness of the upper portion 120 and the lower portion 122, which advantageously assists in the flexibility and overall articulation of the living hinge 124 relative to each of the upper portion 120 and the lower portion 122. The living hinge 124 may be defined as a piano hinge between the upper portion 120 and the lower portion 122 in that the living hinge 124 extends along a length of each of the upper portion 120 and the lower portion 122.

Figures 4, 4A:
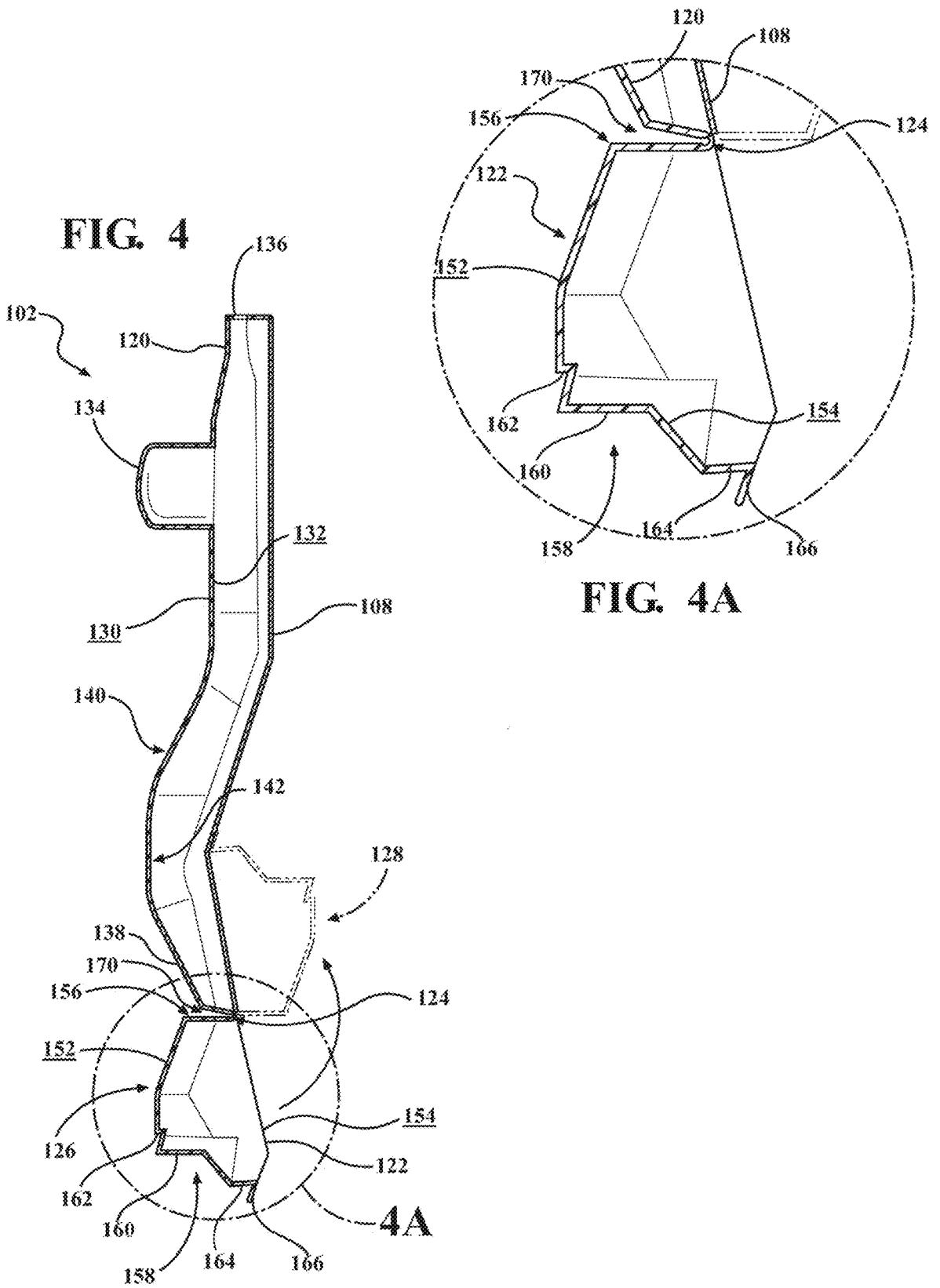
FIG. 4 is a perspective view of an interior panel of a panel assembly according to the present disclosure.
FIG. 4A is an enlarged partial perspective view of a trim element of the interior panel of FIG. 4, taken at area 4A.

Referring still to FIGS. 1-4A, the first position 126 of the trim element 122 is defined as an extended position 126, illustrated in FIG. 4, with the living hinge 124 positioned between and interconnecting the body 120 and the trim element 122. As mentioned above, each of the trim element 122, the living hinge 124, and the body 120 are integrally formed, with the living hinge 124 operable to articulate the trim element 122 relative to the body 120. The trim element 122 translates between the extended position 126 and the second, or folded, position 128. In an assembled configuration of the panel assembly 100, it is contemplated that the trim element 122 is fixed in the folded position 128 relative to the second panel 104, as described in more detail below. In an unassembled configuration of the panel assembly 100, the trim element 122 is in the extended position 126. Assembly of the panel assembly 100 is described in more detail below with respect to FIGS. 5-7.

The trim element 122 includes a first surface 152 and a second surface 154. In the extended position 126, the first surface 152 generally corresponds with the first, outer surface 130 of the body 120, and the second surface 154 generally corresponds with the second, inner surface 132 of the body 120. The first surface 152 of the trim element 122 may also be referred to as the inner surface 152, as the first surface 152 is directed toward the cavity 106 in both the first position 126 and the second position 128. For example, the inner surface 152 defined along the trim element 122 is diametrically opposed to the inner surface 132 defined along the body 120 when the trim element 122 is in the second position 128. In some aspects, the first surface 152 has a stepped configuration with the first surface 152 extending at an angle from a first end 156 of the trim element 122 to a second end 158 of the trim element 122. It is generally contemplated that the angled first surface 152 is configured to provide a uniform construction with a wheel well 32 of the vehicle body 12, as described below with respect to the second panel 104.

As depicted in FIG. 4A, the trim element 122 may taper from the second end 158 toward to first end 156 to generally define a low-profile trim element 122 in the assembled configuration of the panel assembly 100. The low-profile trim element 122 may advantageously save on production and manufacturing costs while also providing a sleek configuration of the panel assembly 100. The trim element 122 may include a ledge 160 defined by the first surface 152 with a lip 162 proximate to the ledge 160. The ledge 160 and the lip 162 may define the stepped configuration of the trim element 122 along the first surface 152. The ledge 160 may cooperate with the vehicle body 12 in at least partially defining the wheel well 32, mentioned above, in the assembled configuration of the panel assembly 100.

As depicted in FIG. 4, the second surface 154 of the trim element 122 may be angled away from the first end 156 of the trim element 122 and may match a contour of the inner surface 132 of the body 120. For example, the trim element 122 may be received within the recessed portion 142 of the body 120 in the second position 128 of the trim element 122, as described below. The second surface 154 of the trim element 122 is generally planar with an attachment surface 164 defined at the second end 158 of the trim element 122 between the first surface 152 and the second surface 154 of the trim element 122. An attachment flange 166 may extend from the attachment surface 164 and may engage the second panel 104 in the assembled configuration of the panel assembly 100. In some examples, the attachment flange 166 may be positioned between the first panel 102 and the second panel 104 to define an attachment point 168 between the first panel 102 and the second panel 104. In other configurations, the attachment point 168 may be defined with the attachment flange 166 positioned along an outer surface 180 of the second panel 104.

With further reference to FIGS. 1-4A, the second surface 154 of the trim element 122 is progressively proximate to the inner surface 132 of the interior panel as the trim element 122 articulates about the living hinge 124. In the assembled configuration of the panel assembly 100, the second surface 154 of the trim element 122 may be substantially parallel with the inner surface 132 of the body 120. In some aspects, the second surface 154 may be in contact with or otherwise adjacent to the central frame 108 when the trim element 122 is in the second position 128. For example, the central frame 108 may abut the inner surface 132 of the body 120 on one side and the second surface 154 of the trim element 122 on an opposing side.

In the extended position 126 of the trim element 122, a gap 170 may be defined between the trim element 122 and the second end 138 of the body 120. The gap 170 may correspond to a thickness of the living hinge 124. In some aspects, the gap 170 may provide space for the trim element 122 to have minor flexion toward the second end 138 of the body 120 while remaining free from contact with the body 120 in the extended position 126. The living hinge 124 may cooperate with the second end 138 of the body 120 and the first end 156 of the trim element 122 to define a bottom edge 112 of the panel assembly 100 when the trim element 122 is in the folded position 128.

With reference to FIGS. 4-7, the second, or exterior, panel 104 is coupled to the interior panel 102 with the central frame 108 defined therebetween. The central frame 108 may be a steel body that provides structural support for the door 18 in the assembled configuration of the panel assembly 100. The central frame 108 may be formed from a stamped steel and may define the pocket 110 configured to selectively receive the window panel 30. The central frame 108 may also define, in part, the support 134. Additionally or alternatively, the central frame 108 may define other projections, pockets, or detail defined along the door 18 that may be later incorporated as part of one or both of the interior panel 102 and the exterior panel 104. As mentioned above, the interior panel 102 and the exterior panel 104 are positioned against the central frame 108 to generally define a slight degree of engagement between the first surface 130 of the first panel 102 and the center frame 108 in a closed position of the door 18. For example, the central frame 108 may press upon the trim element 122 and, as a result of the direct contact between the central frame 108 and the interior panel 102, may be firmly supported to define a seal between the door 18 and the vehicle body 12 (FIG. 1).

The exterior panel 104 is coupled to the interior panel 102 in the assembled configuration of the panel assembly 100 and, like the interior panel 102, has an outer surface 180 and an inner surface 182. As illustrated, the inner surface 182 of the exterior panel 104 and the inner surface 132 of the interior panel 102 define the cavity 106, with the outer surface 180 of the exterior panel 104 being exterior to the vehicle 10. Comparatively, the outer surface 130 of the interior panel 102 faces the interior 14 of the vehicle 10, as mentioned above. In some examples, the exterior panel 104 has a length $L_{104}$ that is less than a length $L_{102}$ of the interior panel 102. For example, a first end 184 of the exterior panel 104 is coupled to or otherwise proximate to the first end 136 of the interior panel 102, while a second end 186 of the exterior panel 104 is offset relative to the second end 138 of the upper portion 120 of the interior panel 102. The offset configuration of the exterior panel 104 accommodates the trim element 122. In the folded position 128, when the panel assembly 100 is assembled. The window panel 30 is disposed at the first ends 136, 184 of the interior panel 102 and the exterior panel 104. The first ends 136, 184 may be spaced apart to define the space in which the window panel 30 is disposed.

The exterior panel 104 is coupled to the interior panel 102 at least along the respective second ends 136, 186. In some examples, as mentioned above, the central frame 108 may be exposed at the trailing end and leading end of the interior panel 102 and the exterior panel 104 to couple the door 18 and the panel assembly 100 to the vehicle body 12 (FIG. 1). The exterior panel 104 includes a flange 188 that is coupled to the interior panel 102 proximate to the second end 138 of the interior panel 102. As described below, in some aspects, the flange 188 of the exterior panel 104 is coupled directly to the central frame 108. In other aspects, described below; the flange 188 is free from contact with the central frame 108 while being coupled to the interior panel 102 via the trim element 122.

Figures 5, 6:
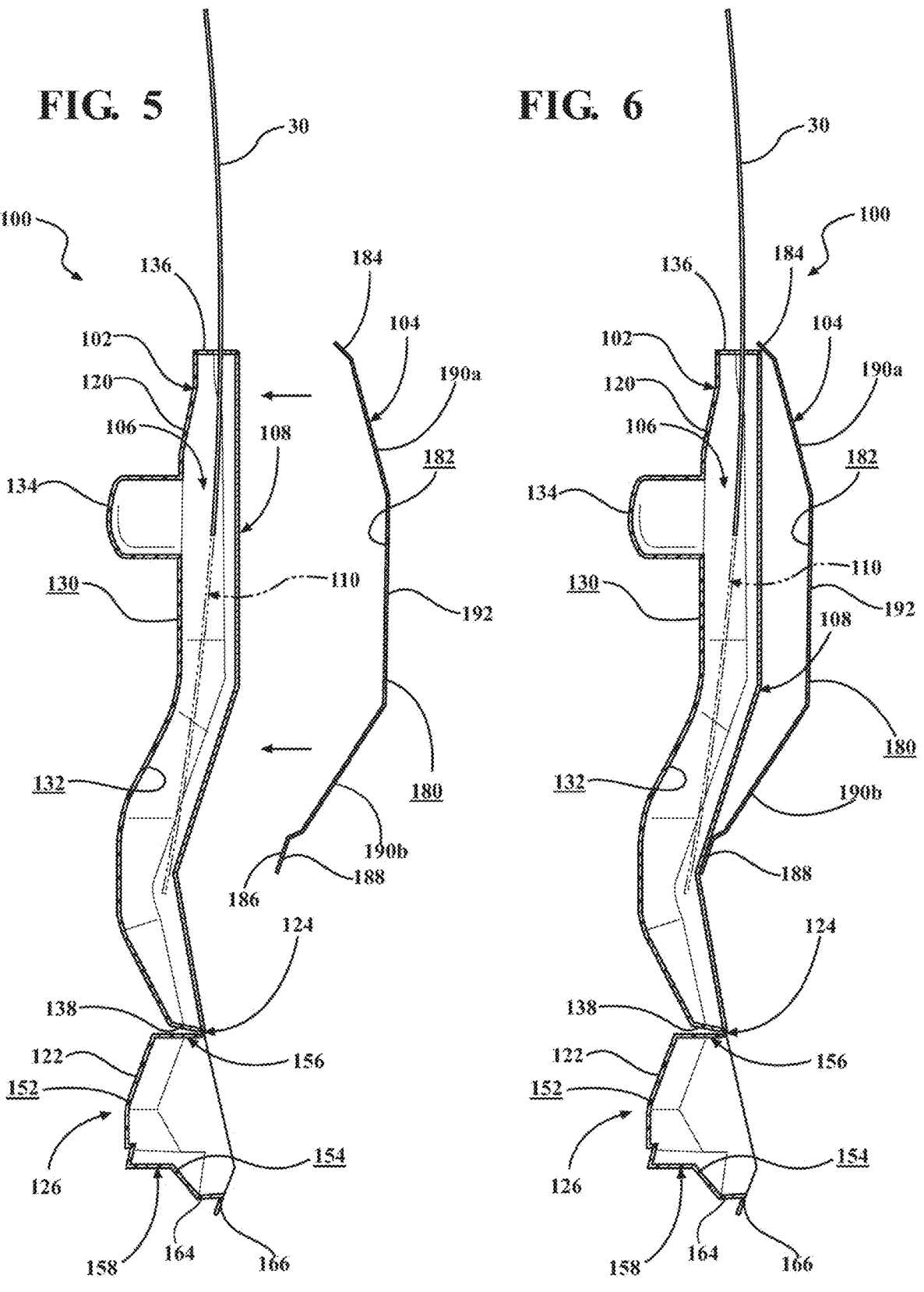
FIG. 5 is a cross-section of a panel assembly according to the present disclosure with an exterior panel removed from an interior panel and a central frame.
FIG. 6 is another cross-section of the panel assembly of FIG. 5 with the exterior panel assembled with the interior panel and a trim element in an extended position.
Figure 7:
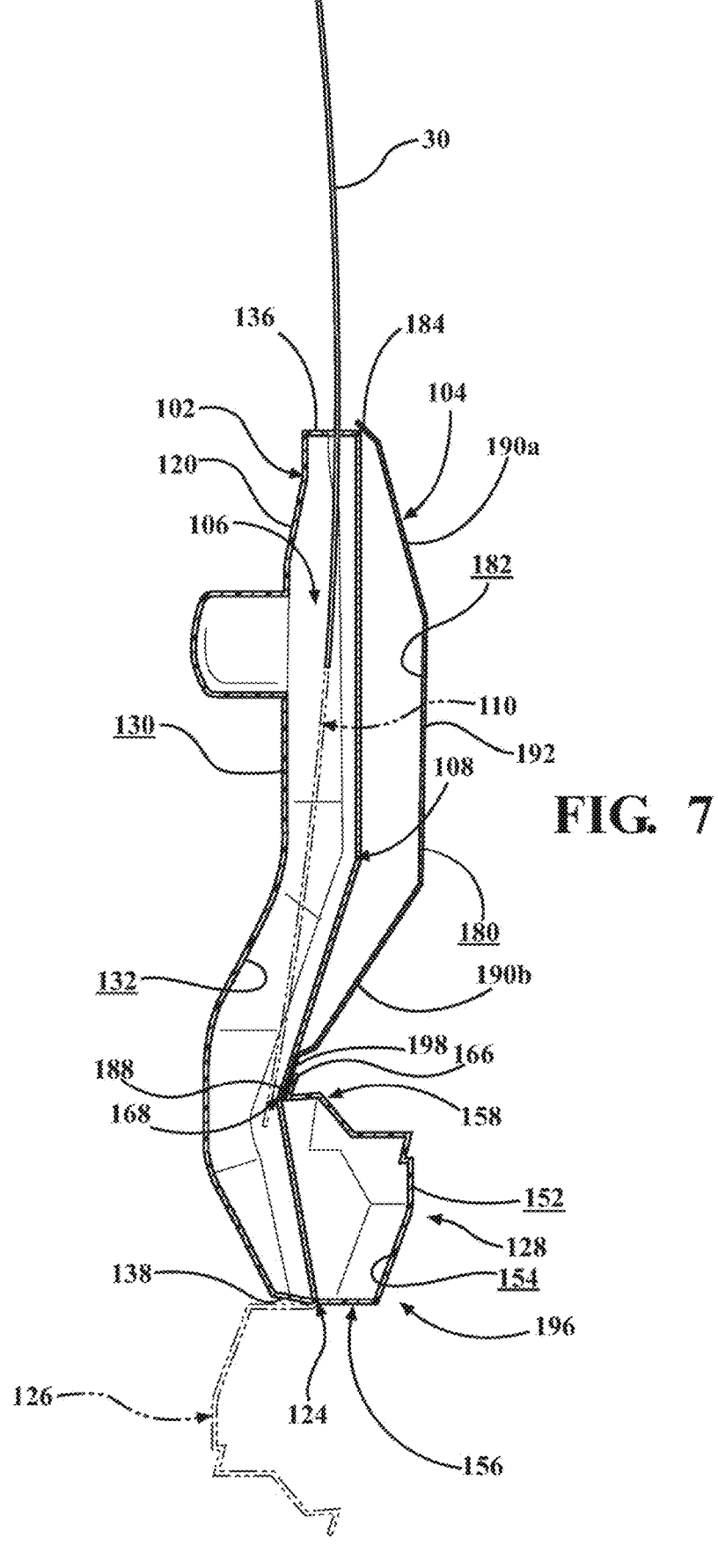
FIG. 7 is another cross-section of the panel assembly of FIG. 6 with the trim element in a folded position.

With further reference to FIGS. 5-7, the exterior panel 104 is depicted with two angled portions 190a, 190b that each diverge from a central portion 192. It is generally contemplated that the central portion 192 may be generally linear as compared with the angled portions 190a. 190b. In some aspects, the central portion 192 may be curved or curvilinear to define a shape or design of the vehicle body 12. The angled portions 190a, 190b may include an upper angled portion 190a and a lower angled portion 190b.

The upper angled portion 190a is defined at the first end 184 of the exterior panel 104 and at least partially defines a window opening 34 of the vehicle body 12. In some examples, the upper angled portion 190a is angled away from the window panel 30 toward the central portion 192. The angle of the upper angled portion 190a may facilitate fluid runoff along the exterior panel 104 from various regions of the vehicle body 12 including, but not limited to, the window panel 30. The upper angled portion 190a may be configured to facilitate retention of the window panel 30 with the panel assembly 100.

The lower angled portion 190b is depicted as a mirror-image of the upper angled portion 190a. For example, the lower angled portion 190b may extend from the central portion 192 toward the second end 186 and the interior panel 102. As illustrated, the central portion 192 is bowed outward from the central frame 108 as a result of the configuration of the upper angled portion 190a and the lowered angled portion 190b. The degree of the angles that form each of the angled portions 190a, 190b may vary depending on the design of the vehicle body 12, such that the angles may be greater than or less than the respective angles depicted of the angled portions 190a, 190b.

With further reference to FIGS. 5-7, the panel assembly 100 is configured to form at least a portion of the door 18 with the first panel 102 coupled to the second panel 104 around the central frame 108. During assembly, the first panel 102 is positioned on an opposing side of the central frame 108 from the second panel 104 with the trim element 122 extending from the living hinge 124. Once the first panel

102 and the second panel 104 are positioned, the trim element 122 may be adjusted via the living hinge 124. Ultimately, the trim element 122 is coupled to the second panel 104 to define the panel assembly 100 in the assembled configuration.

As mentioned above, the trim element 122 extends from the body 120 of the first panel 102 in the extended position 126 prior to assembly of the panel assembly 100. In some examples, the trim element 122 is rotated about the living hinge 124 and is positioned between the central frame 108 and the second panel 104. For example, the first panel 102 may be positioned proximate to the central frame 108, and the trim element 122 may be rotated about the living hinge 124 to encase a bottom 114 of the central frame 108. In this example, the second panel 104 may then be positioned proximate to the central frame 108 with the attachment flange 166 of the trim element 122 positioned between the inner surface 182 of the second panel 104 and the central frame 108. The flange 188 defines a plurality of apertures 188a configured to receive fasteners 166a of the attachment flange 166. For example, the plurality of fasteners 166a may be selectively disposed within the plurality of apertures 188a defined along the flange 188 when the trim element 122 is in the second position 128. While the fasteners 166a may couple the trim element 122 to the flange 188, the flange 188 of the second panel 104 may be coupled to the attachment flange 166 of the trim element 122 via any practicable fastening methods to secure the second panel 104 with the first panel 102 and define the panel assembly 100.

In other aspects, illustrated in FIGS. 5-7, the trim element 122 may be coupled to the outer surface 180 of the second panel 104. For example, the second panel 104 may be positioned proximate to the central frame 108, and the trim element 122 may be coupled to the outer surface 180 of the second panel 104. The flange 188 of the second panel 104 is proximate to the central frame 108, and the attachment flange 166 of the trim element 122 is coupled to the outer surface 180 of the second panel 104. The trim element 122 attaches to the second panel 104 along the attachment surface 164 to secure, at least in part, the first panel 102 with the second panel 104. It is generally contemplated that, in any configuration, the trim element 122 may be coupled to the second panel 104 using any practicable attachment methods including, but not limited to, spot welding and/or fasteners, such as clips.

As mentioned above, the trim element 122 is operable between the extended position 126 (FIG. 6), and the folded position 128 (FIG. 7). The trim element 122 passes from the extended position 126 to the folded position 128 via articulation at the living hinge 124. The trim element 122, being integrally formed with the body 120 and the living hinge 124, forms an extension of the first panel 102 to advantageously define the bottom edge 112 of the panel assembly 100. For example, the trim element 122 defines a bottom region 196 of the second panel 104, which provides a consistent length of the panel assembly 100 in the assembled configuration, as compared to the pre-assembled configuration. In the pre-assembled configuration, illustrated in FIG. 5, the first panel 102 extends a greater length as compared to the second panel 104. For example, the body 120 of the first panel 102 has a length that is greater than the length of the second panel 104. The trim element 122 defines the difference in length between the body 120 and the exterior panel 104 to define the uniform length of the panel assembly 100 in the assembled configuration.

In some examples, a channel 198 may be defined between the trim element 122 and the second end 186 of the second panel 104. The channel 198 may facilitate fluid movement along the vehicle body 12 and is defined between the second end 186 of the second panel 104 and the first end 156 of the trim element 122. In other examples, the second panel 104 may be flush with the trim element 122 to define a fluid seal along the vehicle body 12. In either example, the attachment flange 166 and the flange 188 of the second panel 104 define a seal that is configured to prevent fluid penetration of the cavity 106.

Referring again to FIGS. 1-7, the panel assembly 100 advantageously minimizes production and manufacturing costs, while providing improved utility of the interior panel 102 via the living hinge 124 and the trim element 122. By wrapping the trim element 122 around the bottom 114 of the central frame 108, the trim element 122 minimizes the number of fasteners 166a utilized to secure the trim element 122 with the exterior panel 104. Further, the trim element 122 provides added protection for the central frame 108 by wrapping around the bottom 114 of the central frame 108. The bottom 114 of the central frame 108 is covered by the living hinge 124 and the trim element 122. The living hinge 124 facilitates the movement of the trim element 122 between the extended position 126 and the folded position 128, which advantageously facilitates the assembly of the panel assembly 100.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A panel assembly for a vehicle, the panel assembly comprising:

an interior panel including an upper portion having an outer surface and an inner surface, a lower portion integrally formed with the upper portion and having a first surface and a second surface, and a living hinge defined between the upper portion and the lower portion, the lower portion operable between an extended position and a folded position about the living hinge; and an exterior panel coupled to the interior panel to define a cavity and including a first end and an opposing second end coupled to the lower portion of the interior panel via an attachment flange in the folded position with the lower portion at least partially disposed over the second end of the exterior panel, the attachment flange being disposed between the exterior panel and the interior panel, the exterior panel including a flange coupled to the attachment flange of the lower portion in the folded position of the lower portion.

2. The panel assembly of claim 1, wherein the living hinge is integrally formed with the upper portion and the lower portion.

3. The panel assembly of claim 1, further including a central frame disposed within the cavity defined between the interior panel and the exterior panel.

4. The panel assembly of claim 1, wherein the lower portion is coupled to an inner surface of the exterior panel.

5. A door of the vehicle comprising the panel assembly of claim 1.

6. A vehicle panel assembly, comprising:

a first panel having an outer surface and an inner surface and including an upper portion and a lower portion hingedly coupled to the upper portion via a living hinge and operable about the living hinge between a first position and a second position; and a second panel having an outer surface and an opposing inner surface coupled to the inner surface of the first panel and defining a cavity with the first panel, the lower portion of the first panel coupled to the outer surface of the second panel in the second position of the lower portion.

7. The vehicle panel assembly of claim 6, wherein the living hinge defines at least a portion of a bottom edge of the vehicle panel assembly when the lower portion is in the second position.

8. The vehicle panel assembly of claim 6, wherein the living hinge has a thickness that is less than a thickness of at least one of the upper portion and the lower portion.

9. The vehicle panel assembly of claim 6, wherein the inner surface defined along the lower portion is diametrically opposed to the inner surface defined along the upper portion when the lower portion is in the second position.

10. The vehicle panel assembly of claim 6, wherein the first panel has a length that is greater than a length of the second panel.

11. The vehicle panel assembly of claim 6, wherein the second panel defines a plurality of apertures along a flange of the second panel.

12. The vehicle panel assembly of claim 11, wherein the lower portion includes an attachment flange including a plurality of fasteners selectively disposed within the plurality of apertures defined along the flange when the lower portion is in the second position.

13. A panel assembly for a vehicle door, the panel assembly comprising:

an interior panel having an inner surface and an outer surface collectively defining a body and a trim element integrally formed with the body with a living hinge disposed therebetween; and an exterior panel having an inner surface coupled to the body at the inner surface of the interior panel and an opposing outer surface coupled to the trim element in a folded position of the trim element.

14. The panel assembly of claim 13, wherein the trim element is operable about the living hinge between an extended position and the folded position.

15. The panel assembly of claim 13, wherein the living hinge and the trim element define an extension of the interior panel and define a bottom edge of the panel assembly in the folded position of the trim element.

16. The panel assembly of claim 13, wherein the trim element and the exterior panel define a channel between a bottom region of the exterior panel and an attachment surface of the trim element.

17. The panel assembly of claim 13, wherein the trim element has a stepped configuration and includes a ledge defining a lip.

18. The panel assembly of claim 13, wherein the body defines a recessed portion and the trim element is aligned relative to the recessed portion in the folded position.

* * * * *